(12) United States Patent
Ohta et al.

(10) Patent No.: US 8,093,904 B2
(45) Date of Patent: Jan. 10, 2012

(54) ARC DETECTING DEVICE AND AIRCRAFT EQUIPPED THEREWITH

(75) Inventors: Yoshito Ohta, Mie (JP); Hirotaka Isoda, Mie (JP)

(73) Assignee: Sinfonia Technology Co., Ltd., Tokyo (JP)

( * ) Notice: Subject to any disclaimer, the term of this patent is extended or adjusted under 35 U.S.C. 154(b) by 239 days.

(21) Appl. No.: 12/463,021

(22) Filed: May 8, 2009

(65) Prior Publication Data

US 2009/0284265 A1 Nov. 19, 2009

(30) Foreign Application Priority Data

May 13, 2008 (JP) ................................ P2008-126368

(51) Int. Cl.
*G01R 31/02* (2006.01)
*H01H 9/50* (2006.01)
(52) U.S. Cl. ............................................. 324/536
(58) Field of Classification Search ............. 324/536
See application file for complete search history.

(56) References Cited

U.S. PATENT DOCUMENTS

2007/0247767 A1* 10/2007 Zhang ............................. 361/42
2008/0033602 A1* 2/2008 Dutoya et al. ................ 700/292

FOREIGN PATENT DOCUMENTS

JP 2001-45652 A 2/2001

* cited by examiner

*Primary Examiner* — Vincent Q Nguyen
(74) *Attorney, Agent, or Firm* — Westerman, Hattori, Daniels & Adrian, LLP

(57) ABSTRACT

An arc detecting device includes a detector for acquiring time series data concerning a characteristic quantity, such as a voltage or a current in a circuit, targeted for detecting an arc; a basic data generator for generating basic data made of a plurality of frequency components, through frequency analysis from the acquired time series data; a data processor for statistically processing the generated basic data, thereby converting the basic data to an evaluation value highly correlative to an occurrence of the arc; and an arc judging unit for judging the occurrence of the arc, if the evaluation value exceeds a predetermined arc judgment threshold value. In this manner, the arc detecting device that is capable of effectively detecting the arc in a direct-current power supply circuit is provided.

8 Claims, 13 Drawing Sheets

ARC DETECTING DEVICE AND AIRCRAFT EQUIPPED THEREWITH

BACKGROUND OF THE INVENTION

1. Field of the Invention

The present invention relates to an arc detecting device and an aircraft equipped with the arc detecting device that is capable of particularly effectively dealing with an arc discharge occurring on a direct-current power supply circuit.

2. Background Art

Detecting the arc discharge (an arc fault) on wires is very important for protecting circuits from burnout(s). Conventionally, as a means for detecting an alternating-current arc discharge, as disclosed in Japanese Laid-open Patent Application No. 2001-045652 as Patent Document 1, for example, it has been a routine to keep track of faults, based upon phase or waveform distortions such as voltages or currents and impedance, thereby detecting the arc discharge.

On the other hand, in a direct current (DC) power supply circuit for a direct current load, which is mainly mounted on an aircraft, countermeasure against the arc discharge has not been particularly taken conventionally. This is because a direct current load of a high-voltage current has not been so employed in aircrafts or the like. In recent years, there has been developed a circuit breaker provided in a direct-current power supply circuit, causing the circuit breaker to detect and trip an overcurrent.

DISCLOSURE OF THE INVENTION

Problem(s) to be Solved by the Invention

The reason why an interest in the arc detecting device for the DC power supply circuit increases is that the faults caused by problems associated with wires in an aircraft have often occurred due to the use of more electric devices in the aircrafts. According to a survey concerning the causes of faults having occurred with the wires, half or more of them are due to the occurrence of an arc with the wires in any way.

Assuming that the power supplies in the aircrafts become high in AC and DC voltages (for example, 28 DCV to 270 DCV or 115 ACV to 230 ACV) due to an increased number of bulk-power devices, the arc discharge is more prone to occur than previously. In addition, a heat rate generated at the time of the arc discharge also increases. Thus, the aircrafts can sustain enormous damage, and detecting and protecting the arc discharge having occurred with the wiring are strongly required.

However, such conventional circuit breaker cannot detect the arc discharge. This is because, at time intervals at which the circuit breaker detects and trips an overcurrent, a thermal impact on wiring due to the arc discharge reaches up to a high level at which smoking occurs and because a cable which remains unprotected is burned out due to the occurrence of the arc discharge in no-overcurrent mode. In recent years, circuit breaker products with their arc discharge protection function have become gradually commercially available. Nevertheless, the protection function is not recognized as an established function, since problems such as incorrect arc detection still remain unsolved.

The present invention aims to newly provide an arc detecting device and an aircraft equipped with the arc detecting device that is capable of effectively detect an arc discharge in a DC power supply circuit, the arc discharge being hardly detected considering phase or waveform distortions such as a voltage or a current and impedance, and that is applicable to an alternating-current (AC) power supply circuit or the like.

SUMMARY OF THE INVENTION

Means for Solving the Problem(s)

In order to achieve the above-described object, the present invention provides the following means.

In other words, an arc detecting device of the present invention is characterized by including: a time series data acquisition unit for acquiring time series data concerning a characteristic quantity, such as a voltage or a current in a circuit, targeted for detecting an arc; a basic data generator for generating basic data such as frequency spectra made of a plurality of frequency components, through frequency analysis by means of an FFT or a BPF and the like from the acquired time series data; a data processor for statistically processing the generated basic data in accordance with a predetermined algorithm, thereby converting the basic data to an evaluation value highly correlative to an occurrence of the arc; and an arc judging unit for judging the occurrence of the arc, if the evaluation value exceeds a predetermined arc judgment threshold value.

As characteristic quantities, either a voltage or a current may be handled or both of them can be handled, as long as a characteristic waveform is generated due to an arc. Of course, any other physical quantity, such as impedance, can be handled as a characteristic quantity as long as it is appropriate.

In addition to the characteristic waveforms of an arc voltage or current, a component identical to that of the noise generated at the time of the occurrence of the arc is handled as a characteristic waveform of the arc. Movement of the frequency component of the noise generated at the time of the occurrence of the arc is a phenomenon which is physically identical to that of the frequency component of the voltage or current. Thus, no incorrect detection occurs if the movement of the frequency component of the noise generated at the time of the occurrence of the arc is modeled.

Owing to superimposition, etc. of the disturbance occurring at the sites of a circuit, it becomes impossible to keep track of whether an arc occurs or not, by means of only an ordinary waveform of a characteristic quantity. In this case, however, the voltage or current waveform at the time of an arc discharge generally exhibits a characteristic waveform over a wide frequency domain, like the frequency component of the noise at the time of the occurrence of the arc. Afterwards, time series data is acquired by means of a time series data acquisition unit. A basic data generator generates basic data made of a plurality of frequency components by sampling the acquired time series data. The generated basic data is converted to an evaluation value highly correlative with the occurrence of the arc through statistical processing using a data processor, thereby identifying the presence or absence of the arc. Therefore, the evaluation value is compared with an arc judgment threshold value by means of an arc judging unit, whereby the arc discharge can be detected earlier and appropriately when and after such phenomenon occurs.

A specific aspect of the present invention is characterized in that: the evaluation value converted by the data processor is a Mahalanobis' distance obtained by computing a degree of variance of power spectra according to the plurality of frequency components as an evaluation parameter.

Using the degree of variance, it is possible to evaluate what degree of current varies over time and to appropriately keep track of a fluctuation for discriminating the presence or absence of the occurrence of the arc. By applying a Mahalanobis' technique based upon this fluctuation, a Mahalanobis' distance, the value of which greatly deviates, is computed according to the presence or absence of the occurrence of the arc, thus making it possible to effectively utilize an evaluation value as a standard for arc judgment.

Another specific embodiment of the present invention is characterized in that: the evaluation value output by the data processor is a total value obtained by scoring the power spectra of the plurality of frequency components and counting the scored power spectra as the evaluation parameter.

By handling the thus scored power spectra as the evaluation value also, arc judgment can be appropriately performed in conformity with the characteristics in the case of the occurrence of the arc, and the amount of computation can be effectively reduced.

Further, a tripping unit for tripping the circuit if the arc judging unit has judged the occurrence of the arc is further provided, making it possible to avoid burnout(s) of a load device or cables in advance by taking countermeasures earlier. Therefore, it is very effective that aircrafts having entailed a problem with the occurrence of the arc due to an increased number of mounted devices in recent years in particular are equipped with the above-described arc detecting device.

Advantageous Effect(s) of the Invention

According to the present invention, with the above-described construction, in the various fields of industrial equipment or household equipment, such as the field of aeronautics industry, there can be provided a novel, effective arc detecting device which is capable of appropriately detecting an arc without losing a timing, thereby making it possible to effectively protect equipment from burnout(s) or the like, even with a direct-current power supply circuit in which an arc detection due to a phase or distortion is difficult. Of course, the detection function of the detecting device is applicable to an alternating-current power supply circuit as well. Such arc detecting devices are mounted on the aircrafts having entailed the problem with the occurrence of the arc in recent years in particular, making it possible to remarkably improve reliability and safety of the aircrafts.

Figure 1:
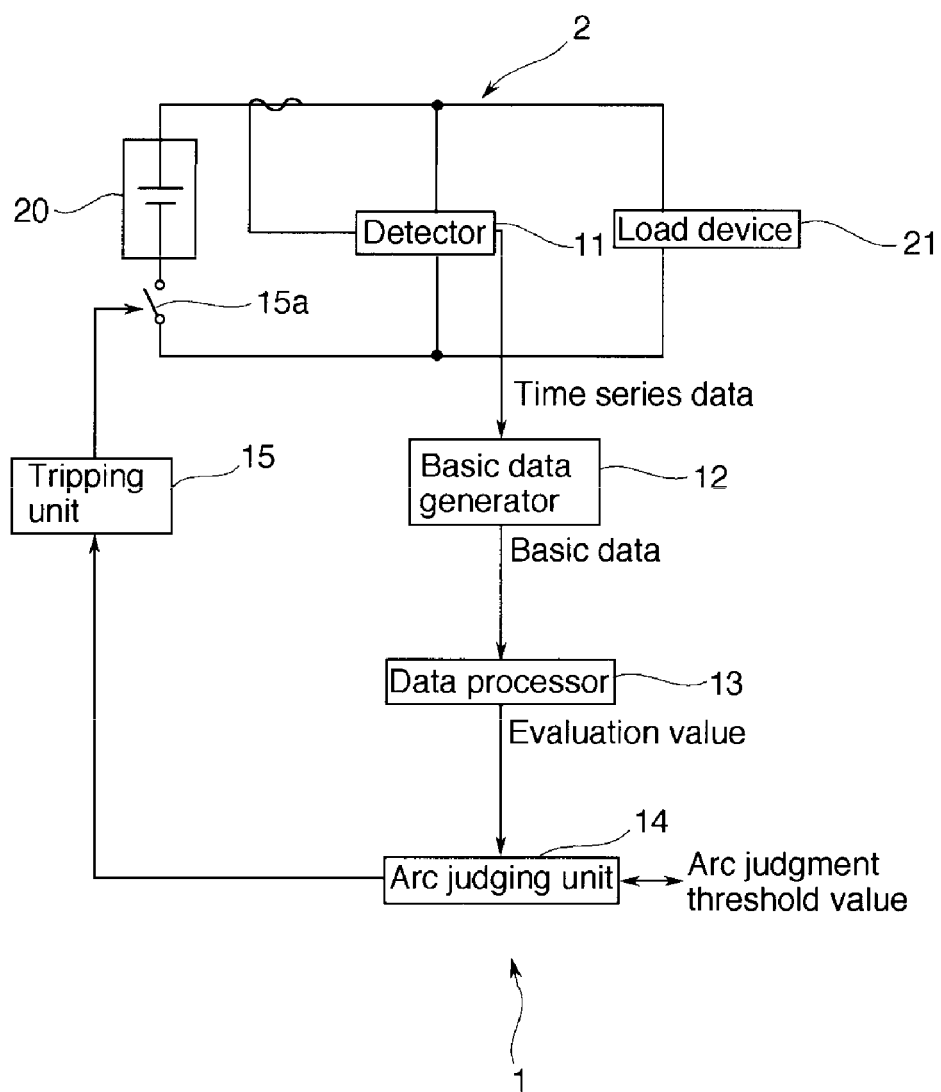
FIG. 1 is a block diagram depicting a configuration of an embodiment of the present invention.

Hereinafter, one embodiment of the present invention will be described, referring to the drawings.

A direct current (DC) arc detecting device 1 of the embodiment is mounted on an aircraft. The DC arc detecting device 1 is particularly effective for detecting a series arc of a direct current (DC) power supply circuit 2 having a direct current (DC) power supply 20 as shown in FIG. 1. As load devices 21 to be connected, there are employed a variety of load devices, such as an inverter load device, a LAMP load device, a slide load device, a DC/DC converter, a resistance load device, an inductive load device, and a capacitive load device. The DC power supply 20 may include a tripping function of tripping a circuit responsive to voltage and current faults, such as an over-voltage or a voltage level drop, for the purpose of circuit protection. However, if an arc occurs, the smoking from a circuit occurs before the tripping function works, resulting in burnout(s). Therefore, earlier detection of the arc is required.

An arc current/voltage waveform is always characterized in that it varies over time and is unstable; includes a high-frequency, wide-band spectrum component; and has a plenty of discontinuous frequency components. However, it is difficult to clearly judge whether the arc occurs or not, considering only the waveforms of characteristic quantities such as a voltage or a current, because a direct current is targeted to be detected and because, if an alternating-current component occurs, such component is caused by superimposition of the disturbances occurring at sites of a circuit, for example. Therefore, it is impossible to judge the occurrence of an arc, with only a conventional tripping function of tripping circuits after an arc discharge has been judged considering only a voltage or current level.

The arc detecting device 1 of the embodiment, as shown in FIG. 1, includes: a detector 11 as a time series data acquisition unit for acquiring time series data concerning characteristic quantities such as a voltage or current in the DC power supply circuit 1 targeted for arc detection; a basic data generator 12 for generating basic data made of a plurality of frequency components, through frequency analysis, considering the time series data acquired by the detector 11; a data processor 13 for statistically processing the generated basic data, thereby converting the processed data to an evaluation value which is highly correlative with the occurrence of an arc; an arc judging unit 14 for judging whether or not the arc occurs, where the evaluation value has exceeded a predetermined arc judgment threshold value; and a tripping unit 15 for opening a circuit breaker 15a disposed in the DC power supply circuit 1 to trip a circuit, where the arc judging unit 14 judges whether the arc occurs or not.

Figure 2:
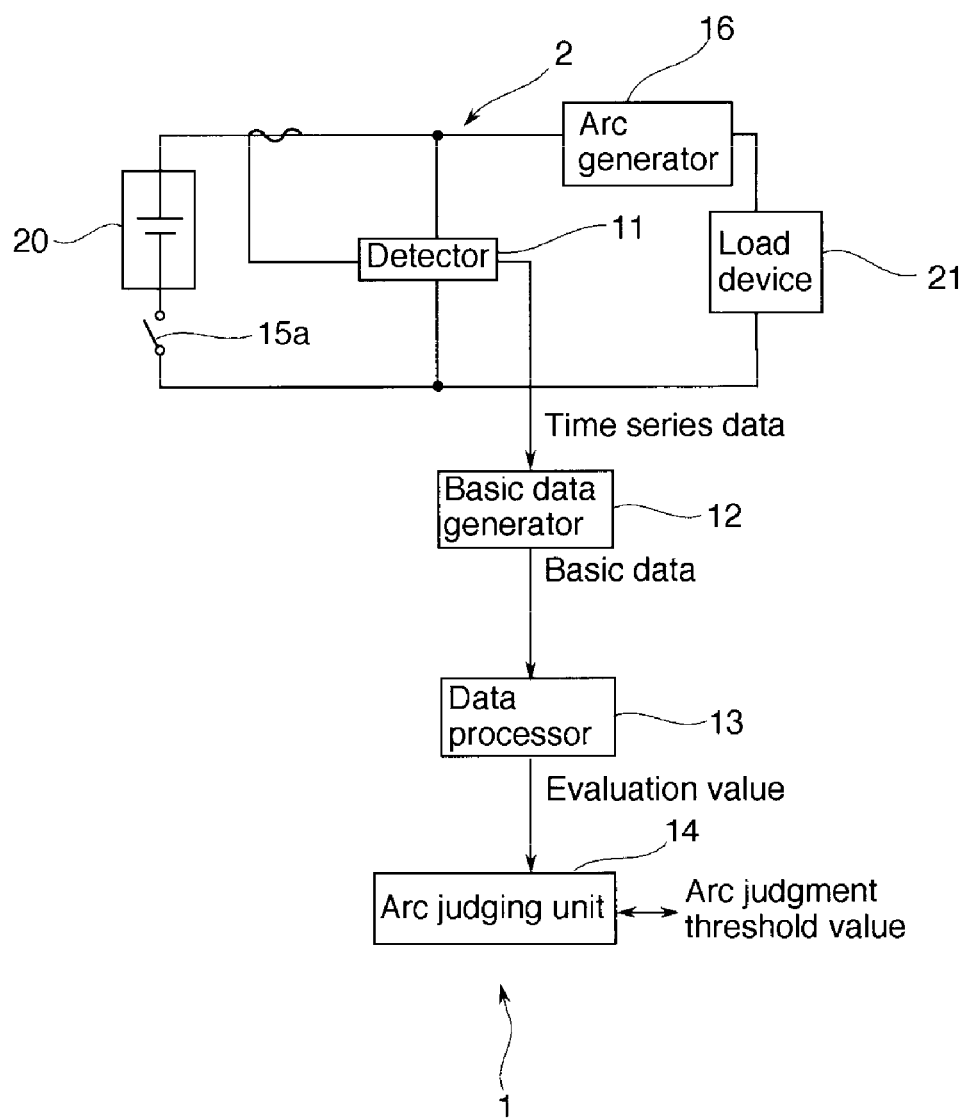
FIG. 2 is a view showing a modification of a circuit for detecting an arc, according to the embodiment.

An arc judgment threshold value employed in the arc judging unit 14 is determined based upon an evaluation value output by the data processor 13 if an arc actually occurs with the DC power supply circuit 1. The characteristic quantities of voltages or currents need to be acquired in advance at the time of the occurrence of the arc, through the detector 11. As described previously, a variety of disturbances are superimposed on a current, making it difficult to judge whether or not the arc occurs, concerning only a current waveform. Upon implementing the arc judging unit 14 of FIG. 1, as shown in FIG. 2, an arc generator 16 is inserted into the DC power supply circuit 1 in order to actively generate an arc. In that state, the waveform of characteristic quantities such as a current is measured by means of the detector 11, and the evaluation value output by the data processor 13 is stored as an arc judgment threshold value.

The basic data generator 12 generates basic data made of a plurality of frequency components through frequency analysis from the time series data acquired by the detector 11. An FFT (Fast Fourier Transform) or a BPF (Band-Pass Filter) and the like can be utilized in frequency analysis.

The data processor 13 outputs an evaluation value according to the presence or absence of the arc, by statistically processing the aforementioned basic data. In order to keep track of whether the arc occurs or not, it is important to capture what is constructed by the power spectra of a plurality of picked up frequency components, specifically what degree of scale the power spectra are and what degree of fluctuation occurs. By statistically processing the power spectra of a plurality of frequency components, a value indicating a phenomenon in which characteristic quantities are apparently on the same scale and determination of the presence or absence of an arc is difficult, is converted to an evaluation value which is strongly correlative with the arc, and the presence or absence of the arc can be identified.

Techniques of statistical processing in the data processor 13 include: computing a degree of variance from power spectra, thereby computing a Mahalanobis' distance which is an evaluation value; and scoring power spectra of a plurality of frequency components and computing a total value while the scored power spectra are employed as an evaluation parameter. Specific examples of these techniques will be introduced in Examples 1 and 2 to be described later.

An arc judging unit 14 compares a received evaluation value with a prestored arc judgment threshold value; makes arc judgment as to whether or not the evaluation value exceeds the arc judgment threshold value; and outputs the fact that the arc occurs, if the threshold value is exceeded.

When the occurrence of the arc is output from the arc judging unit 14, a tripping unit 15 opens a circuit breaker 15*a* disposed in a DC power supply circuit 1, and stops power supply to a load. This circuit breaker 15*a* may utilize a tripping function if the DC power supply 20 has the tripping function.

Likewise the basic data generator 12, the data processor 13, the arc judging unit 14, and the tripping unit 15 are mainly comprised of ordinary microprocessors including a CPU, a memory, and an interface, as required, and programs and/or data required to perform a variety of processes are stored in the memory. The CPU serially invokes these programs and/or data from the memory, and performs predetermined computation and processes.

With the above-described construction, even where it is impossible to judge whether the arc occurs or not, considering only the waveforms of characteristic quantities such as a voltage or a current, owing to a switching operation or owing to noise and other superimposition of disturbances occurring at sites of the DC power supply circuit 1, an arc discharge exhibits a characterizing waveform over a wide frequency domain. Time series data is acquired by means of the detector 11 that is a time series data acquisition unit; basic data made of a plurality of frequency components is obtained through sampling by the basic data generator 12 for the time series data; and these items of data are converted to an evaluation value which is highly correlative to an arc through statistical processing by the data processor 13, whereby the presence or absence of an arc can be identified. Thus, whether the arc occurs or not can be appropriately judged based upon an arc judgment threshold value by the arc judgment unit 14 before a thermal impact upon wires due to arc discharge reaches up to a high level at which smoking occurs or before cables remaining unprotected are burned out due to the occurrence of the arc discharge in a mode in which no overcurrent flows.

The DC power supply circuit 1 is tripped from the tripping unit 15 to the circuit breaker 15*a*, thereby making it possible to speedily deal with an arc; effectively protect the load device 21 or cables from burnout; and remarkably improve reliability and safety of an aircraft equipped therewith.

EXAMPLE 1

Next, a description of Example 1 will be given below. In the example, based upon basic embodiments above, arc discharge types or arc characteristics were specifically discussed, the target arc discharge was specified, and specific discussion and construction of arc detection algorithms were attempted after the characteristic waveforms of an arc had been kept track of, by performing acquisition and testing of arc characteristic data.

(1) Types of Arc Discharges

The target DC power supply circuit 1 includes a parallel arc and a series arc, and this Example describes the series arc in particular. If the parallel arc occurs, a power short-circuit occurs, and a large current flows, thus making it possible to protect circuits by a fast short-circuit protection circuit mounted on a test piece such as a power unit. However, if the series arc occurs, no large current flows, thus making it impossible to protect circuits with the short-circuit protection circuit. Although the series arc seems to be a weak arc, testing was performed in such a manner that the series arc is generated by causing vibration in a state in which screws of a terminal board of 28 DCV are loosened. Afterwards, it was reported that a temperature exceeding 200 degrees Celsius was obtained at a site at which the arc occurred, and smoking was verified from cables. Therefore, short-circuit protection is required.

(2) Characteristics of Arc

It is known that an arc is characterized in that:

arc current/voltage waveforms always vary over time and are unstable, and include spectrum components of a high-frequency wide band from several Hz to GHz;

a plenty of discontinuous frequency components are provided;

the amplitude of noise in a wide frequency bandwidth due to arc is appropriately inversely proportional to a signal frequency and decreases; and the characteristic waveform of an arc discharge varies with an arc length, an atmospheric pressure, or a surface state (chemical conditions such as arc evaporation or ionized metals).

It is difficult to detect a rush current occurring at the time of a capacitive load in an illumination dimmer or a computer and the like or a load having nonlinear characteristics which are often seen in a hydraulic pump or a motor. This is because such current or load generally exhibits its spectrum characteristics which are very similar to those of an arc discharge.

Figure 3:
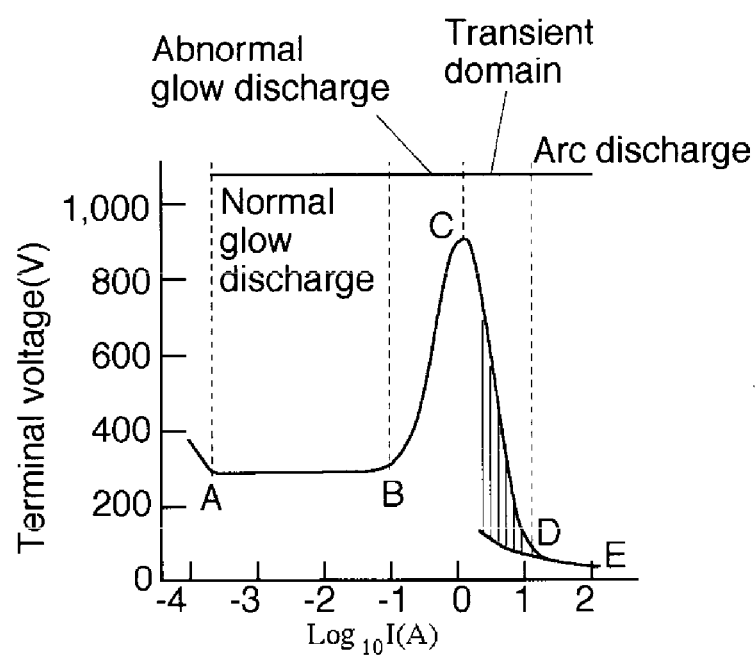
FIG. 3 is a graph showing arc current-voltage characteristics according to Example 1.

Further, it is known that the voltage across an arc if an arc discharge occurs depends upon a load current. Arc suppression is prone to occur, since a glow discharge occurs with a site indicated by "C" of FIG. 3, namely, in a domain in which a current of 1 A or less flows and because the terminal voltage across an arc is high in comparison with a power voltage of 270 V. On the other hand, if 1 A indicated by "C" is exceeded, the voltage across an arc (terminal voltage in FIG. 3) rapidly drops between a transient domain and an arc discharge domain, and is lowered in comparison with the power voltage of 270 V. Thus, if the arc occurs, arc suppression is hardly made. With the increase of a current, the voltage across the arc gently varies, and the arc is prone to be stable.

(3) Target Arc Discharge(s)

AC and DC power supplies are available, and only the DC power supply will be chiefly described here. Unlike an AC arc, a DC arc does not have a zero point of a power voltage or current. Thus, once an arc occurs, such arc is extremely hardly suppressed. Further, a large amount of heat is generated even in a series arc, owing to a high power voltage. Further, in order to safely handle a high-voltage DC, detection and protection of a series arc is contemplated to be an indispensable technique. Therefore, this Example aims at detecting the series arc of the high-voltage DC (270V system).

(4) Arc Characteristic Data Acquisition Test

The characteristics of current/voltage waveforms appearing if an arc discharge occurs, need to be detected in order to incorporate an arc discharge protection function. This testing was implemented for the purpose of observing the voltage/current waveforms if the arc discharge occurs and acquiring basic data for sampling characteristic waveforms. The above testing was also performed for a series arc of a 270 DCV system. An overview of a tester is similar to that shown in FIG. 2. An arc discharge was artificially generated using the arc generator 16, and the voltage and current waveforms if an arc occurred were acquired. Arc characteristic waveforms were sampled by comparing the acquired data with data obtained if no arc occurs.

Figure 4:
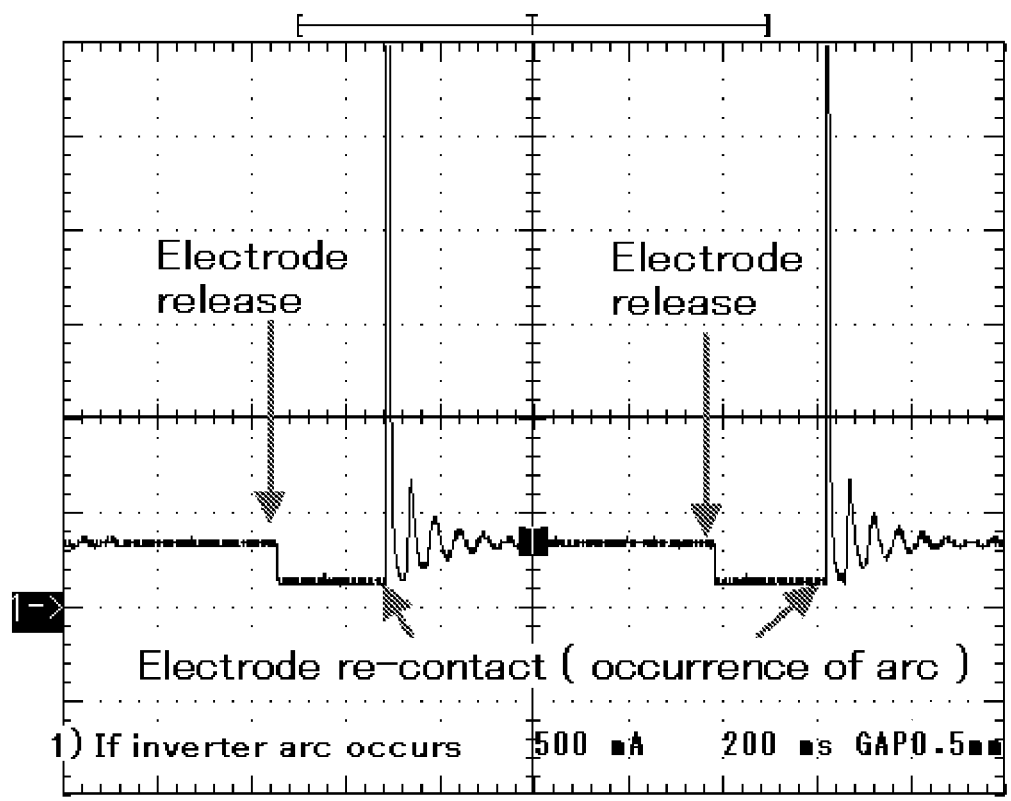
FIG. 4 is a graph showing a current waveform at the time of the occurrence of an inverter-load arc according to the example.

FIG. 4 shows a current waveform if an arc discharge occurs with a power system to which an inverter load is connected. The arc discharge is generated by repeating the electrode contact/release of the arc generator 16. Although the inverter load is hardly observed, since an arc is suppressed immediately when a load current is small, the arc occurs momentarily when the electrodes come into contact with each other again. An arc continuation time is extremely short.

Although other test results are not shown, it is characterized that a rush current occurs when power supply is started on a LAMP load, and a spark exerted by the arc occurs momentarily when the electrodes are in contact with each other again after the occurrence of the arc. In the DC/DC converter, an arc was suppressed momentarily because a load current was small. In the resistance load, the characteristics of current waveforms were observed by varying a load current. While, in a load current of 1 A, a spike-like current occurred and the current waveform was unstable, it became gradually stable with the increase of a current, and no spike was observed in a current of approximately 2 A. A current fluctuation was observed in a domain of 2 A, and it was verified that this fluctuation component decreased with the increase of a current. For a capacitive load, the arc hardly occurred immediately after the electrodes had been spaced from each other, and arc suppression was made. When the electrodes came into contact with each other again, a rush current flowed, and a spark due to the arc was observed only momentarily. An arc continuation time is extremely short.

(5) Arc Characteristic Waveform

A load current, which flows to a DC power supply, was employed. When a voltage was utilized, it might be incorrectly detected that the arc generated in another system occurred with one's own system. Therefore, the load current that flows to the DC power supply was parameterized and utilized for detection. First, the power spectra of current waveforms were obtained if an arc occurred.

Figure 5:
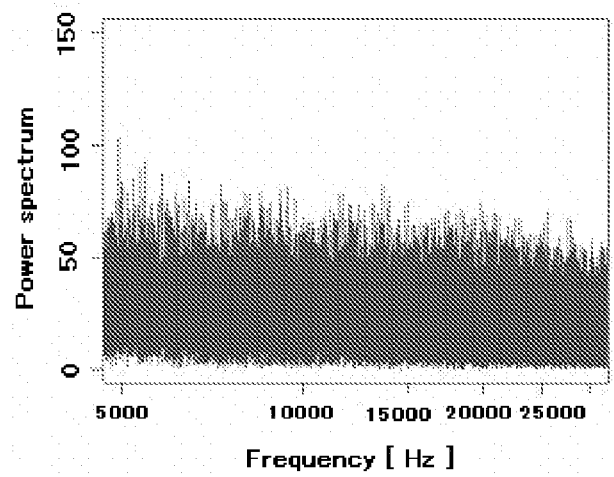
FIG. 5 is a graph showing an appearance of current power spectra and fluctuations at the time of a resistance-load arc according to the example.
Figure 5:
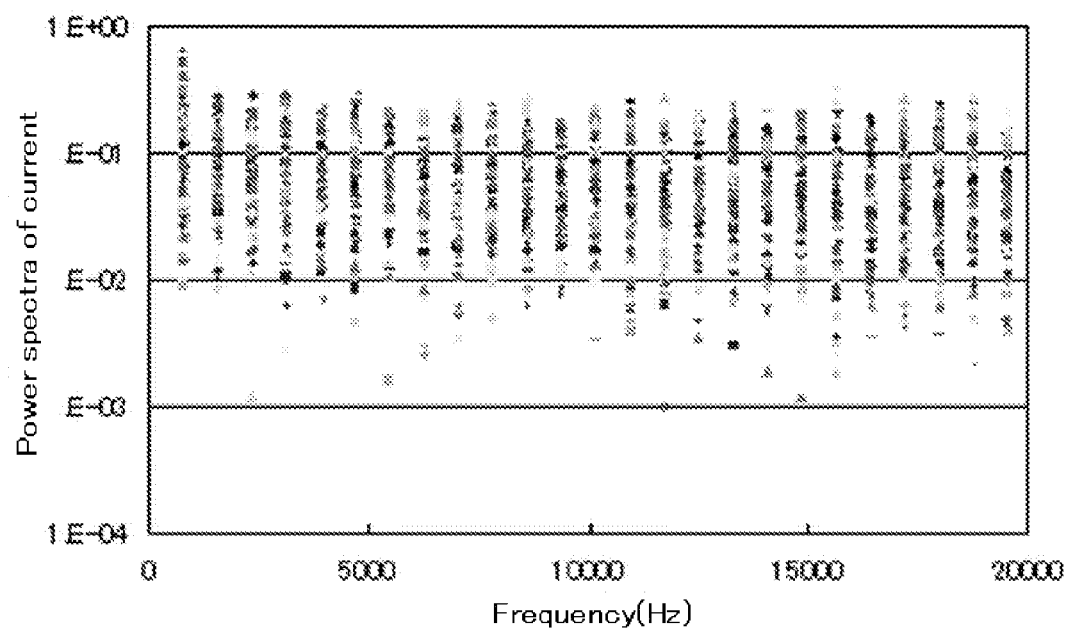

The voltage across an arc (arc voltage) always varies if the arc occurs. In FIG. 5, while the power spectra of a load current at the time of generating an arc after connecting a resistance load are obtained by 1.3 milliseconds, and data is then plotted 100 times, it is found that the power spectra of frequencies dynamically vary over time. This fluctuation is equivalent to an impedance fluctuation, and a load current is also thereby influenced and varies. This fluctuation component can be observed on the order of 1 kHz to 100 kHz, and attenuates with the increase of frequency. Movement of this component is that of a noise component if the arc occurs, i.e., movement of generating jiggling noise. An arc can be detected by keeping track of a time variation of this current.

Figure 6:
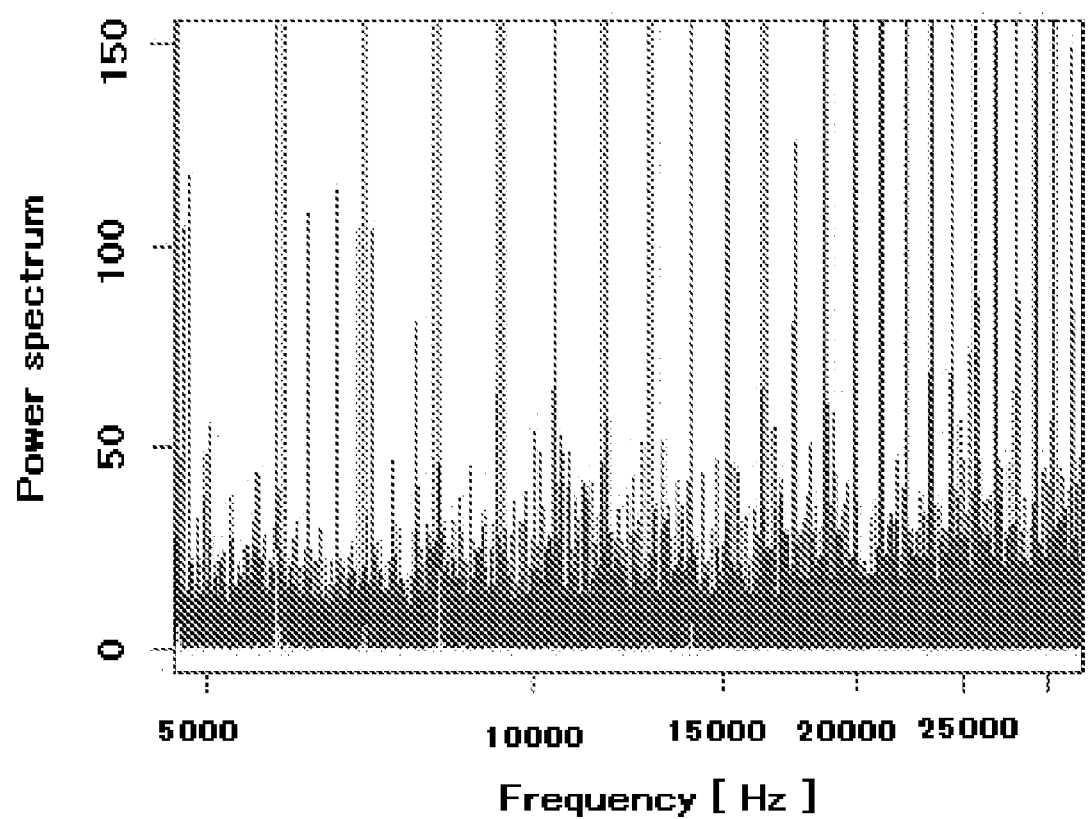
FIG. 6 is a graph showing current power spectra at the time of inverter-load normal operation according to the example.

A current waveform of a load associated with switching often becomes a problem. As to the load associated with switching which often occurs with an inverter or a DC/DC converter, a switching operation is repeated on the order of approximately several kHz to several hundreds of kHz. Thus, the component influenced by this operation emerges with a current waveform. FIG. 6 shows a result produced by obtaining the power spectra of a load current at the time of inverter load operation. As shown in the figure, a large amount of spectra are produced in permissible components of a switching frequency and its harmonic, and small spectra are produced in other components. In order to discriminate such a load from continuous spectra of an arc, a plurality of frequencies need to be observed simultaneously. Therefore, it is contemplated that a relative influence can be reduced by other components which are not influenced by these frequencies, even if the frequency component of one of the plurality of spectra comes under a switching frequency or its harmonic.

Figure 7:
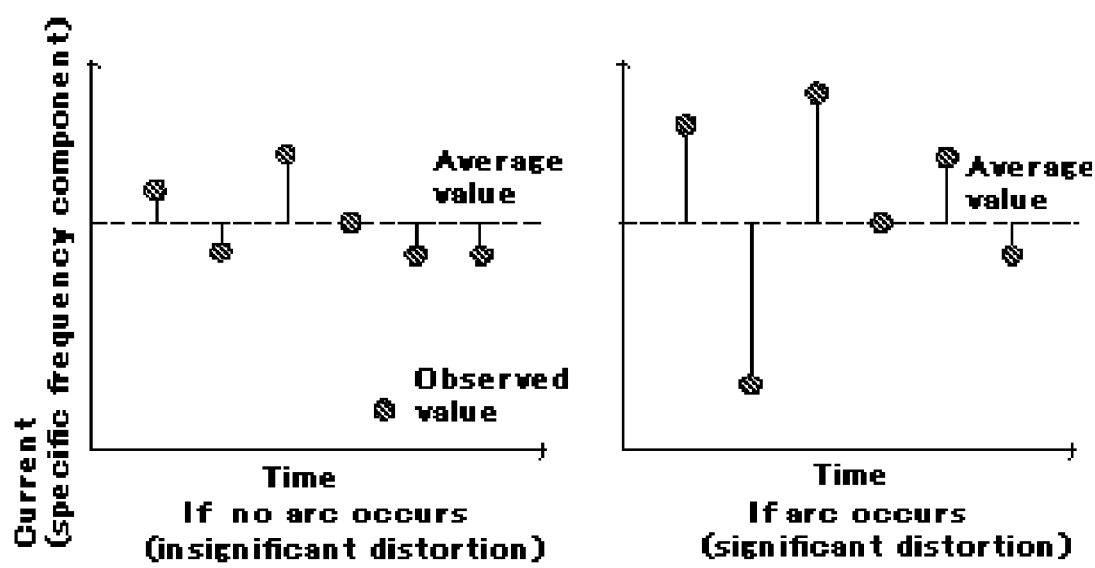
FIG. 7 is an evaluation chart of a time variation quantity of a current component using an unbiased variance according to the example.

Next, an unbiased variance, which is a degree of variance in time series data of current spectrum components, was obtained in order to verify that a difference in fluctuation of current waveforms exists between an arc discharge and a normal load. As shown in FIG. 7, it is possible to evaluate what degree of current varies over time, by using an unbiased variance value.

Power spectra were obtained by means of the FFT using 64 plots of data sampled at 50 kHz, the 64 plots of the sampled data were used as time series data, and an unbiased variance was computed by the formula below.

$$\text{Variance } "u" = \frac{\sum_{i=0}^{63}\left(\begin{array}{c}\text{Average value of } A[i] -\\ A[0 \text{ to } 63]\end{array}\right)^2}{64-1} \qquad \text{[Formula 1]}$$

Figure 8:
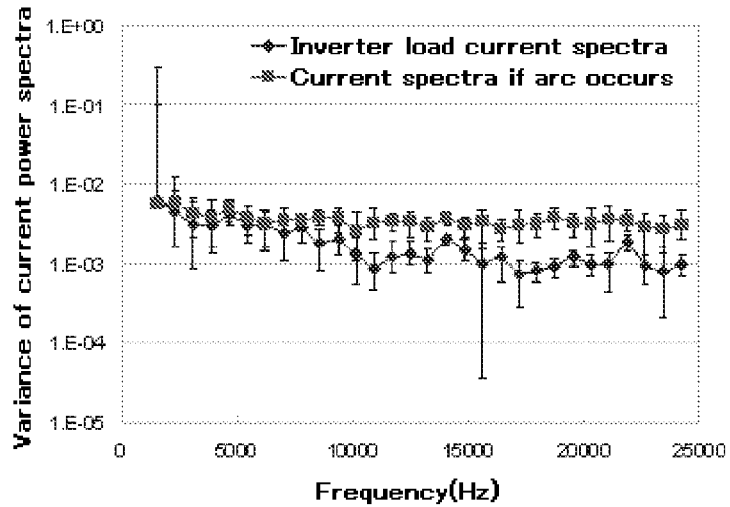
FIG. 8 is a graph showing an unbiased variance of current power spectra according to the example.

The graph of FIG. 8 shows the average values of variance data of which the volume corresponds to 250 times of plotting. The maximum-minimum range of spectra was plotted as an error bar. Even with an inverter load of which waveform characteristics are similar and which is the most indistinguishable from an arc; and the spectra produced if the arc occurs, a significant difference can be identified, as long as a frequency of 10 kHz or more is obtained. Therefore, it was found that a fluctuation of a current over time can be used to detect an arc.

(6) Discussion of Arc Detection Algorithm
i) Algorithm Employed (MTS Approach)

A current fluctuation exerted by an impedance change, which is a characteristic waveform if an arc occurs, was utilized. The MAHALANOBIS TAGUCHI System (MTS) approach was employed to evaluate detected current waveforms. Although it will be described later in detail, a Mahalanobis' distance D2 is obtained by the following formula using inverse matrix $R^{-1}$ of a correlation coefficient matrix.

$$D^2 = \frac{1}{k} U R^{-1} U^T \quad \text{[Formula 2]}$$

Parameters used to compute the Mahalanobis' distance are shown in Table 1 below.

TABLE 1

| Symbols | Description | Types | Remarks |
|---|---|---|---|
| $u_j$ | Observation data | Variable | Four variables are used ($u_1$ $u_2$ $u_3$ $u_4$) |
| $U_j$ | Standardized observation data | Variable | Four variables used ($U_1$ $U_2$ $U_3$ $U_4$) |
| k | Observation data | Fixed value | k = 4 Because four spectra are used |
| $R^1$ | Inverse matrix of correlation coefficient | Fixed value | Inverse matrix of correlation coefficient |
| $m_j$ | average value data | Fixed value | Average value of observation data obtained by generating inverse matrix of correlation coefficient. k = 4. |
| $\sigma_j$ | Standard deviation data | Fixed value | Standard deviation of observation data obtained by generating inverse matrix of correlation coefficient |
| $D^2$ | Mahalanobis' distance | Variable | Value obtained for evaluation |

Figure 9:
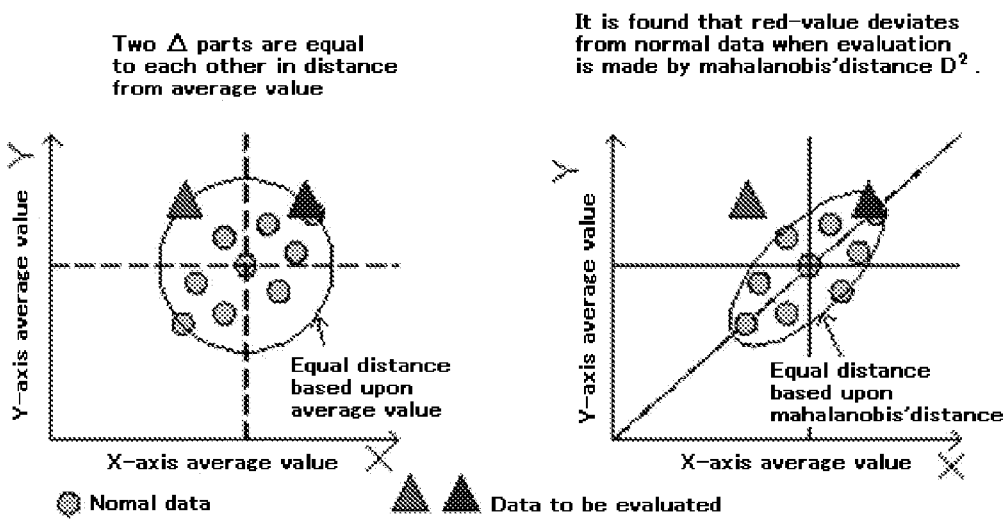
FIG. 9 is a conceptual view of a Mahalanobis' distance according to the example.

FIG. 9 shows a concept of pattern recognition using a Mahalanobis' distance when evaluation is made using two-dimensional data concerning X and Y axes. At the left part of FIG. 9, a distance from an average of each of X and Y axes of normal data (●) of data (upper left ▲, upper right ▲) to be evaluated is equal to another one (upper left ▲=upper right ▲). In the Example, as shown at the right part of FIG. 9, the Mahalanobis' distance is obtained as upper left ▲>upper right ▲, and it is possible to detect that upper left ▲ is more distant from a normal state than upper right ▲. In an evaluation using the Mahalanobis' distance, a scale is determined considering a correlation between parameters to be evaluated. Therefore, this evaluation is very effective if there is a correlation between the parameters to be evaluated.

ii) Parameters for Evaluation

In the abovementioned algorithm, attention was focused on the fact that the current spectra constantly fluctuate if an arc occurs. If the arc occurs, a current component exerted by the arc is observed in a wide spectra domain, and at the same time, spectrum components constantly vary over time. Time series data for the current spectra is required to detect current fluctuation of this current spectrum.

Figure 10:
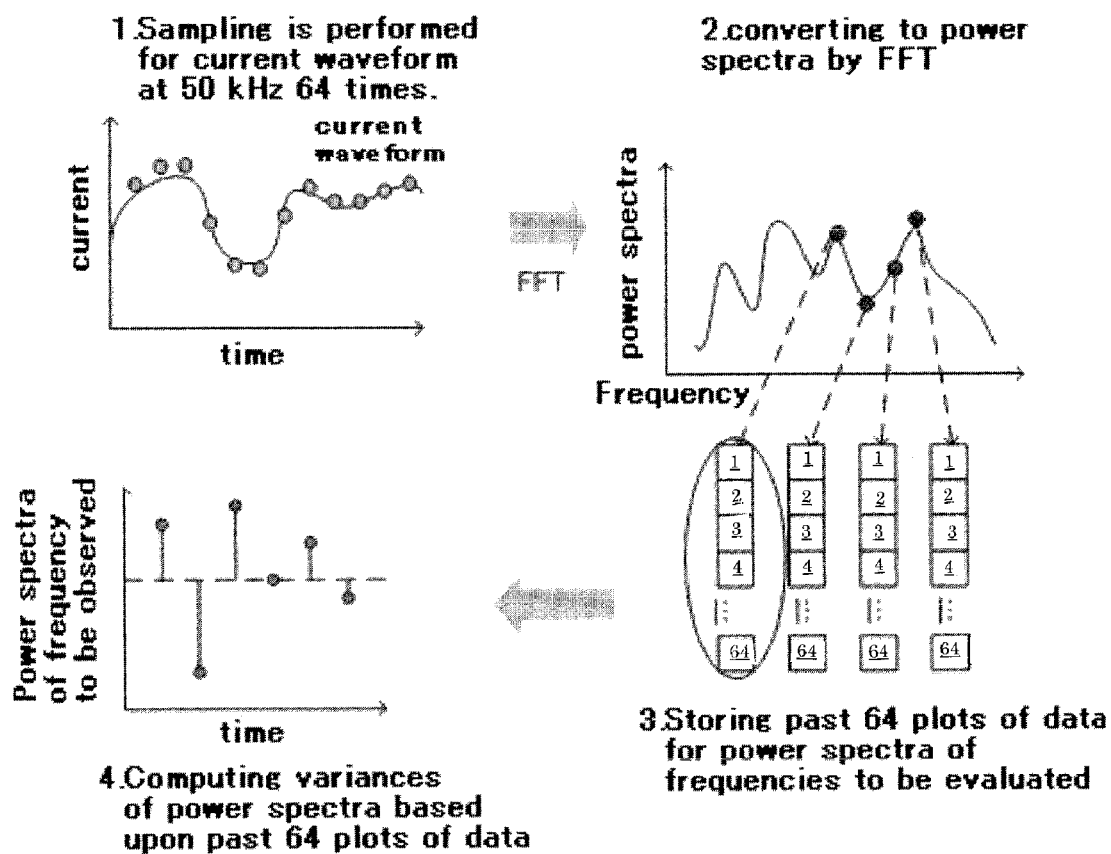
FIG. 10 is a view showing a process of computing unbiased variance of current power spectra according to the example.

First, a computation quantity of the Mahalanobis' distance was discussed. As described above, a computation using an inverse matrix of a correlation coefficient matrix is required to compute the Mahalanobis' distance. When a computation is performed where the number of parameters to be evaluated is N and a length of time series data for the parameters is M, a matrix of (N×M) rows and (N×M) columns is obtained, and the order of computation quantity is $O((N \times M)^2)$. The quantity of computation increases with the square of the number of parameters, thus requiring the use of a large-scale computer. In this algorithm, an unbiased variance was computed using the time series data, and the Mahalanobis' distance was computed using the computed, unbiased variance as a parameter (see FIG. 10). The unbiased variance value of current spectra was obtained utilizing the fact that the value increases due to the fluctuation seen if an arc occurred. The computation quantity of the unbiased variance was obtained as O(M), and the computation quantity of the Mahalanobis' distance was obtained as $O(N^2)$. Further, an impact upon the computation quantity was successfully reduced when the number of time series data was increased to acquire stable data.

iii) Preparation for Using the MTS Technique

Pattern recognition using the MTS technique requires data concerning a reference point for obtaining the Mahalanobis' distance in advance. In this algorithm, on the basis of data concerning a case in which no arc occurred, the unbiased variation values of the power spectra of four frequencies were employed as evaluation parameters. First, time series data of 64 plots were acquired as to the power spectra of the four frequencies of a load current, the unbiased variation values were obtained, and vectors were produced (1ny to 4ny in Table 2). The data concerning the case in which no arc occurred, for obtaining the standard, were prepared by n=about 3,000. The unbiased variation of a respective one of the power spectra was obtained in the same manner as that shown in FIG. 11.

TABLE 2

| | Items | | | |
|---|---|---|---|---|
| Data | 16.4 kHz Variance data | 17.1 kHz Variance data | 18.0 kHz Variance data | 18.7 kHz Variance data |
| No. 1 | $y_{11}$ | $y_{12}$ | $y_{13}$ | $y_{14}$ |
| 2 | $y_{21}$ | $y_{22}$ | $y_{23}$ | $y_{24}$ |
| 3 | $y_{31}$ | $y_{32}$ | $y_{33}$ | $y_{34}$ |
| ... | ... | ... | ... | ... |
| n | $y_{n1}$ | $y_{n2}$ | $y_{n3}$ | $y_{n4}$ |
| Average value | $m_1$ | $m_2$ | $m_3$ | $m_4$ |
| Standard deviation | $\sigma_1$ | $\sigma_2$ | $\sigma_3$ | $\sigma_4$ |

As to the unbiased variation values of the obtained power spectra, an average value "m" and a standard deviation "σ" were obtained, based upon a respective one of the spectra, and vectors (No. 1 to No. n) were standardized by the formula below.

$$Y_{ij} = \frac{y_{ij} - m_j}{\sigma_j} (i = 1 \sim n \approx 3000, j = 1 \sim 4) \quad \text{[Formula 3]}$$

As to the average value "m" and a standard deviation "σ" that were employed for the abovementioned standardization, the same values were employed for standardization of data for arc detection as well. A correlation coefficient matrix R was then obtained using the standardized data. The correlation coefficient matrix was obtained by the formula below, and a 4×4 matrix was obtained when four items of data were used.

$$r_{ij} = \frac{\sum_{p=1}^{n} Y_{pj} Y_{pj}}{n}, R = \begin{bmatrix} 1 & r_{12} & r_{13} & r_{14} \\ r_{21} & 1 & r_{23} & r_{24} \\ r_{31} & r_{32} & 1 & r_{34} \\ r_{41} & r_{42} & r_{43} & 1 \end{bmatrix}$$ [Formula 4]

The inverse matrix of a correlation coefficient matrix is employed when the Mahalanobis' distance $D^2$ is computed. Thus, the amount of computation obtained at the time of detection can be reduced by obtaining the inverse matrix in advance at the time of preparation.

$$R^{-1} = \begin{bmatrix} 1 & r_{12} & r_{13} & r_{14} \\ r_{21} & 1 & r_{23} & r_{24} \\ r_{31} & r_{32} & 1 & r_{34} \\ r_{41} & r_{42} & r_{43} & 1 \end{bmatrix}^{-1} = \begin{bmatrix} a_{11} & a_{12} & a_{13} & a_{14} \\ a_{21} & a_{22} & a_{23} & a_{24} \\ a_{31} & a_{32} & a_{33} & a_{34} \\ a_{41} & a_{42} & a_{43} & a_{44} \end{bmatrix}$$ [Formula 5]

iv) Computation of the Mahalanobis' Distance During Arc Detection

The Mahalanobis' distance D2 was obtained, and it was judged whether or not a current arc discharge occurred. First, a vector "u" of data targeted to be evaluated was generated in a manner similar to that to be performed when the inverse matrix of the correlation coefficient was produced in preparation. The unbiased variation of the current observed in the same manner as that shown in FIG. 10 was obtained for each of the frequencies.

$$u = (u_1 u_2 u_3 u_4)$$ [Formula 6]

Next, the elements of the abovementioned vector were standardized, and a vector U was produced. The standardization was formed by the formula below.

$$U_j = \frac{u_j - m_j}{\sigma_j}$$ [Formula 7]

A variable "$m_j$" is an average of unit spaces and a variable "$\sigma_j$" is a standard deviation, respectively, both of which are fixed values obtained in advance in preparation. Using this process, the scale of observation data can be aligned with that of the inverse matrix of the correlation coefficient. After the preparation for computation had been ready, the Mahalanobis' distance $D^2$ was computed. The Mahalanobis' distance was obtained by the formula below, wherein "k" is the number of elements of the vector U, which is fixed at k=4, R−1 is the inverse matrix of the correlation coefficient obtained in preparation and is a fixed value, and $U^T$ is a transposed matrix of the vector.

$$D^2 = \frac{1}{k} U R^{-1} U^T$$ [Formula 8]

Figure 11:
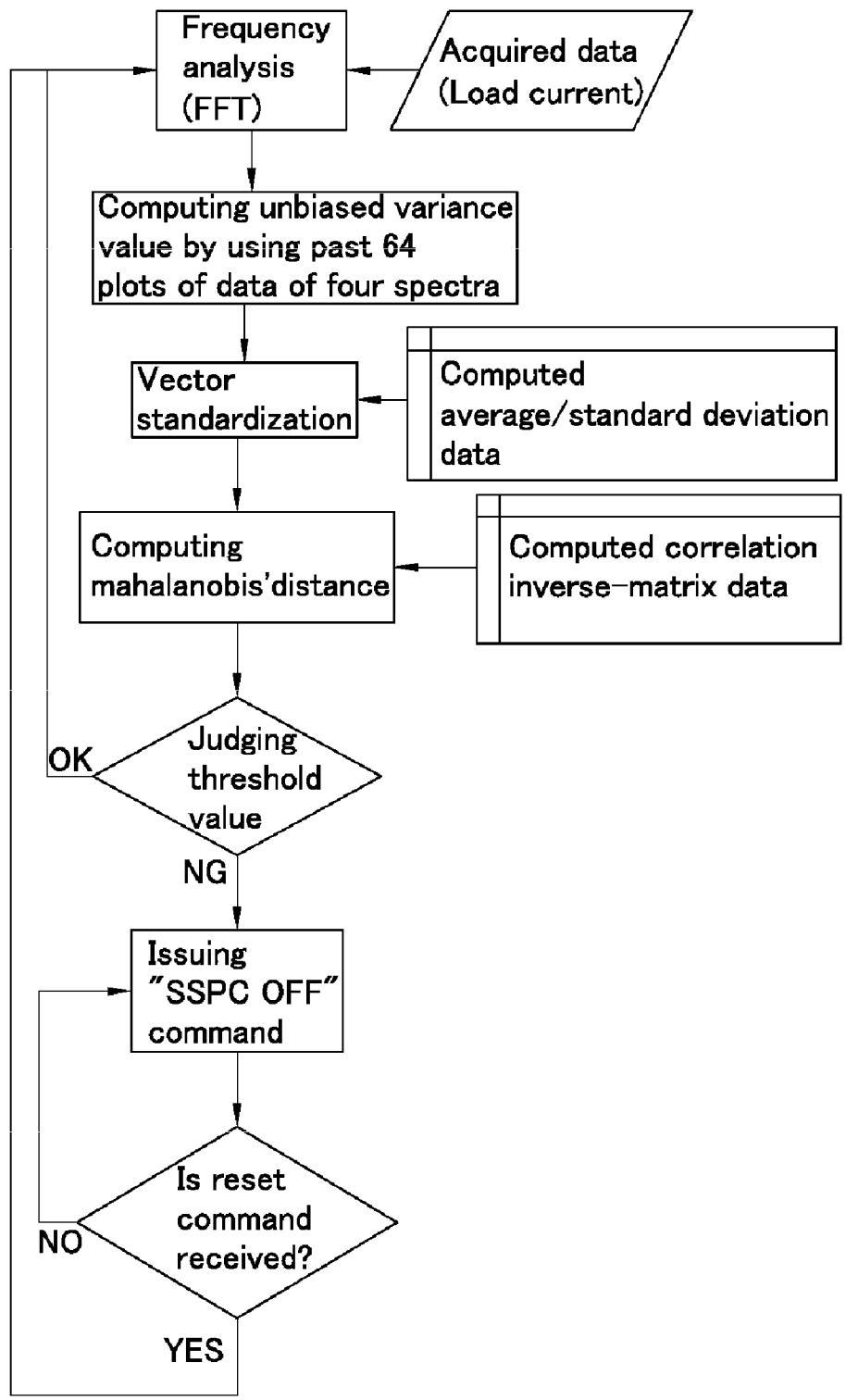
FIG. 11 is a flowchart showing a detection algorithm according to the example.

A flowchart concerning the above algorithms is as shown in FIG. 11.

In comparison between the procedures of FIG. 11 and the block diagram of FIG. 1, the detector 11 that is a time series data acquisition unit acquires acquisition data (load current). Further, the basic data generator 12 performs frequency analysis by means of the FFT, and computes numeric values of unbiased variations as basic data, using the past 46 items of data of four spectra. After these values have been vector-standardized, the data processor 13 computes the Mahalanobis' distance, and the arc judging unit 14 performs threshold judgment. If the threshold value is met, the subsequent acquisition data is acquired and processes are restarted from frequency analysis. If the threshold value is exceeded, it is judged to be NG. Afterwards, a tripping command (SSPC OFF command) is issued from the arc judging unit 14, and the circuit breaker 15a is tripped. The tripped state of the circuit breaker 15a is maintained until a subsequent reset command is received.

v) Study of Algorithms

Figure 12:
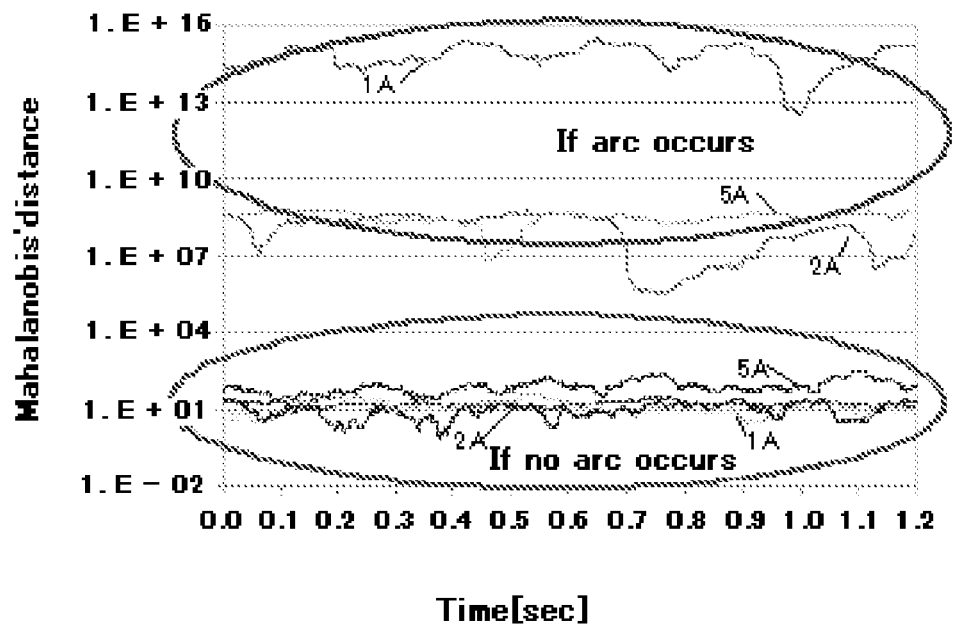
FIG. 12 is a graph showing a result of computation of the Mahalanobis' distance, according to the example.

On the basis of a result of discussion of the algorithms, the observed current waveforms were processed on a personal computer (PC), and the Mahalanobis' distance was obtained and studied. FIG. 12 shows a result of computation of the Mahalanobis' distance by employing the current waveform data concerning the cases in which an arc occurred and not, the volume of which corresponds to 1.2 seconds, when a resistance load is applied. The data concerning the cases where the arc occurred and not were plotted on a superimposed manner at load currents of 1 A, 2 A, and 5 A. The horizontal axis indicates time and the vertical axis indicates the Mahalanobis' distance, both of which are in a log scale. This graph is intended to show in what degree of order the Mahalanobis' distance is. Thus, there is no interrelationship between the items of data with respect to the time axis.

As the result, the Mahalanobis' distances in the cases where no arc occurred and an arc occurred were between $10^1$ and $10^3$ and $10^5$ or more, respectively, and a significant difference was verified between the cases in which the arc occurred or not.

vi) Evaluation of Performance

Figure 13:
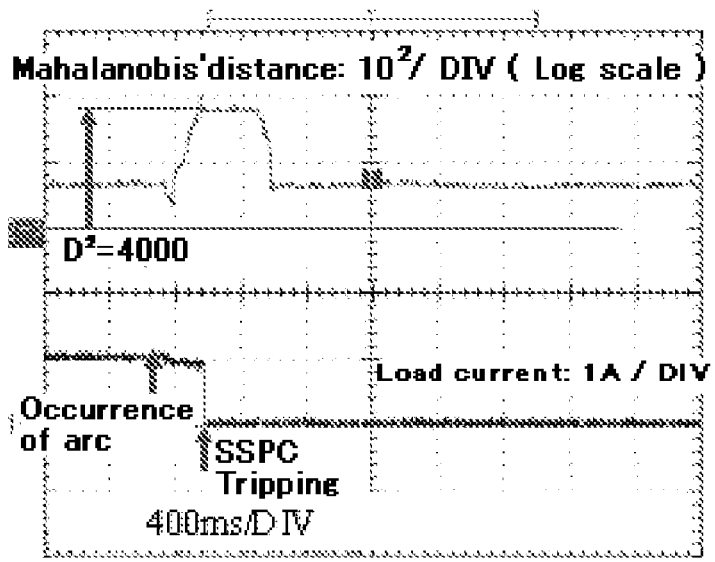
FIG. 13 is a graph showing an appearance of arc detection of a resistance load (1 A), according to the example.

FIG. 13 shows: a load current when an arc is generated in a state in which power is supplied to a resistance load 1 A; and a Mahalanobis' distance computed using samples. An arc judgment threshold value is set at $D^2$=4000. From the figure, it is found that: the Mahalanobis' distance rapidly increases in excess of $D^2$=4000 which is a threshold value for judgment of an arc discharge at the same time as when an arc occurred; and that the tripping unit 15 of FIG. 1 trips the circuit breaker 15a (SSPC in the figure).

Figure 14:
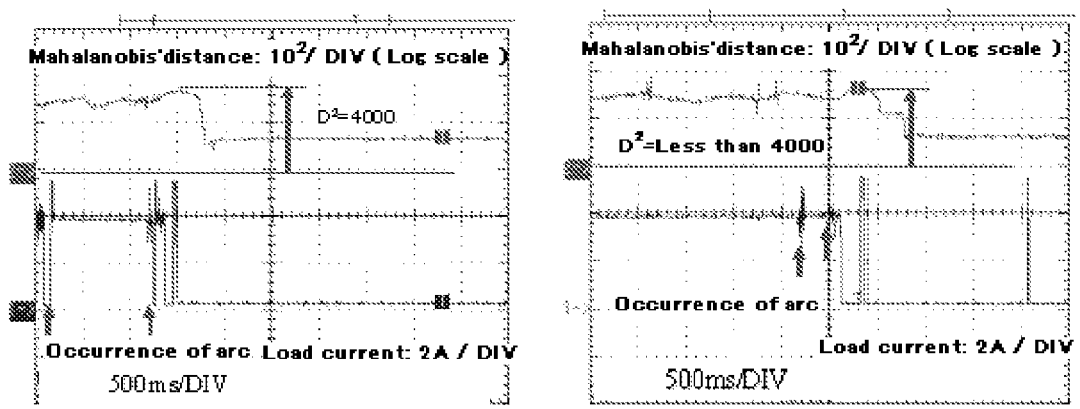
FIG. 14 is a graph showing an appearance of arc detection of an inverter load, according to the example.

FIG. 14 shows a load current when an arc discharge is generated in a state in which an inverter load is active and a Mahalanobis' distance computed using samples. From each of the left and right sides of the figure, it is found that the Mahalanobis' distance increases after an arc occurs, and substantially reaches $D^2$=4000 as a threshold value.

While the above-proposed algorithms were applied to a DC power distribution system, there is a high possibility that the proposed algorithm is available for use in AC series arc detection.

Further, while data, such as the correlation coefficient matrix and average and variance values, for computing the Mahalanobis' distance by the above-proposed algorithms, has been measured and computed in a pre-established manner by means of experimentation, it is also possible to measure these items of data in a state in which the data are mounted on an actual device, and further, construct an arc detecting device by employing a method for dynamically generating parameters used to learn the measurements.

EXAMPLE 2

Figure 15:
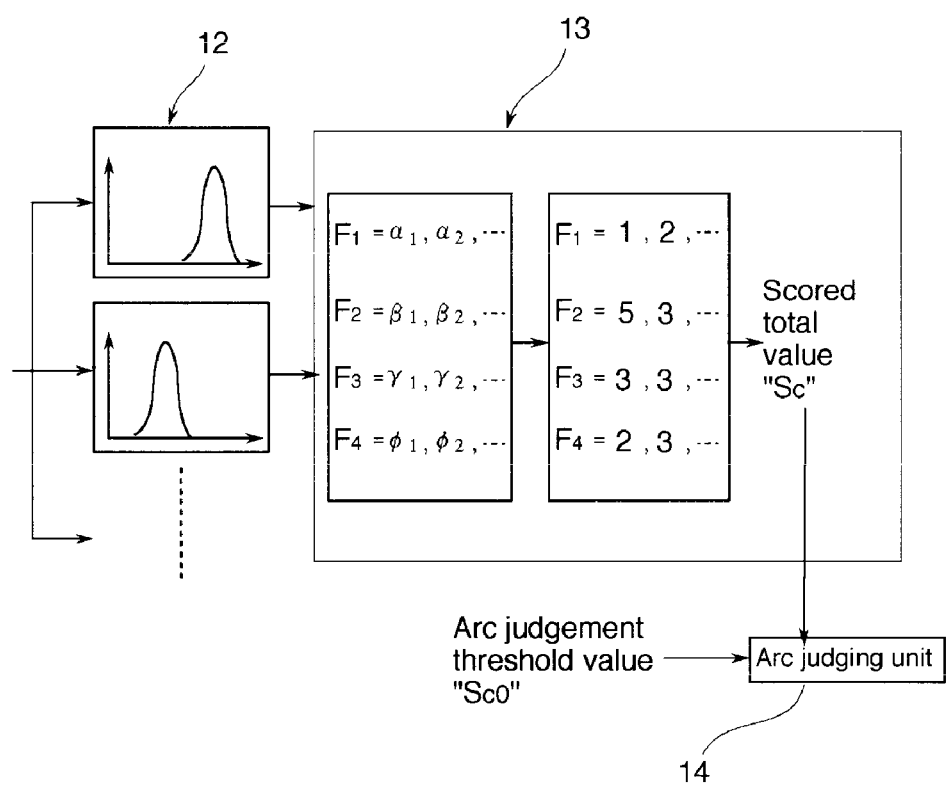
FIG. 15 is a block diagram depicting essential parts of a configuration according to Example 2 of the present invention.

FIG. 15 shows an example of scoring the power spectra of a plurality of frequency components, and using a total value obtained by counting the scored power spectra as evaluation parameters.

In this Example, the basic data generator 12 is a BPF (Band-Pass Filter) which acquires the time series data detected by the detector 11 of FIG. 1, in accordance with a plurality of frequency bands. This generator serves to generate items of basic data, i.e., $\alpha(\alpha_1, \alpha_2 \ldots)$, $\beta(\beta_1, \beta_2 \ldots)$, $\gamma(\gamma_1, \gamma_2 \ldots)$, $\phi(\phi_1, \phi_2 \ldots)$, for four frequencies $F_1, F_2, F_3, F_4$, for example.

The data processor 13 scores these items of basic data "$\alpha$". For example, this processor scores 1, 2, 3 . . . in accordance with the scale of frequency spectra, for example. Afterwards, using the scored items of data as evaluation parameters, statistical processing, such as computing a standard deviation of the scored items on a frequency-by-frequency basis, is applied in order to keep track of a deviation. The greater the deviation over a wide frequency bandwidth is (the greater the fluctuation is), the higher the tendency of the occurrence of the arc is. While a total value "Sc" obtained by counting standard deviations is defined as an evaluation value, arc judgment is performed in comparison with a predetermined arc judgment threshold value "$Sc_0$" in the arc judging unit 14. If the total value Sc exceeds the arc judgment threshold value "$Sc_0$", the arc judging unit 14 judges that the arc occurs. By doing this, as the waveform detected from the circuit is closer to the characteristic waveform generated if the arc occurs, the evaluation value increases more significantly. Therefore, the arc can be effectively detected by a comparatively simple computation. Further, the burnout(s) of the load device or cables can be effectively prevented in the same manner as that in Example 1 described above, by associating the judgment result of the arc judging unit 14 with that of the tripping unit 15 of FIG. 1.

Using the above-scored data as evaluation parameters, in comparison between the average value of the score of each frequency and a score corresponding to a prestored characteristic waveform generated if the arc occurs, after counting has been performed so that the higher the similarity is, the higher the point is, if a predetermined arc judgment threshold value is exceeded using the total value as an evaluation value, the arc judging unit 14 may judge the occurrence of the arc. By doing this also, as the waveform detected from the circuit is closer to the characteristic waveform generated if an arc occurs, the evaluation value is higher. As long as the current or voltage level of the detected waveform does not vary with that of the prestored characteristic waveform generated if the arc occurs, arc judgment can be effectively performed, and a computational load can be further reduced. Of course, when the voltage or current level, etc., varies between the detected waveform and the prestored characteristic waveform generated if the arc occurs, it can also be adjusted to be uniform, for example, by multiplying a coefficient.

While the embodiments and Examples of the present invention have been described hereinbefore, the specific configuration of constituent elements is not limitative thereto. Various modifications can occur without departing from the spirit of the invention.

What is claimed is:

1. An arc detecting device, comprising:
    a time series data acquisition unit for acquiring time series data concerning at least one of a voltage or a current in a circuit, targeted for detecting an arc;
    a basic data generator for generating basic data made of a plurality of frequency components, through frequency analysis from the acquired time series data;
    a data processor for statistically processing the generated basic data, thereby converting the basic data to an evaluation value highly correlative to an occurrence of the arc; and
    an arc judging unit for judging the occurrence of the arc, if the evaluation value exceeds a predetermined arc judgment threshold value,
    wherein an unbiased variance is computed using time series data of power spectra and the Mahalanobis' distance is computed using the computed unbiased variance as a parameter.

2. The arc detecting device according to claim 1, wherein the evaluation value is a Mahalanobis' distance obtained by computing a degree of variance of power spectra according to the plurality of frequency components as an evaluation parameter.

3. The arc detecting device according to claim 2, further comprising a tripping unit for tripping the circuit if the arc judging unit judges that an arc occurs.

4. An aircraft, comprising the arc detecting device according to claim 3.

5. An aircraft, comprising the arc detecting device according to claim 2.

6. The arc detecting device according to claim 1, further comprising a tripping unit for tripping the circuit if the arc judging unit judges that an arc occurs.

7. An aircraft, comprising the arc detecting device according to claim 6.

8. An aircraft, comprising the arc detecting device according to claim 1.

* * * * *